Aug. 30, 1960 — F. E. NULL — 2,951,175
DETECTOR SYSTEM
Filed Oct. 23, 1956 — 3 Sheets-Sheet 1

INVENTOR.
FAY E. NULL

Aug. 30, 1960 F. E. NULL 2,951,175
DETECTOR SYSTEM
Filed Oct. 23, 1956 3 Sheets-Sheet 2
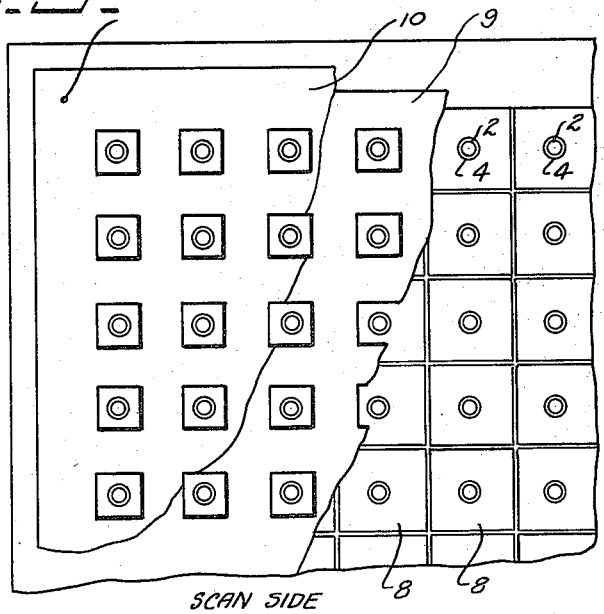
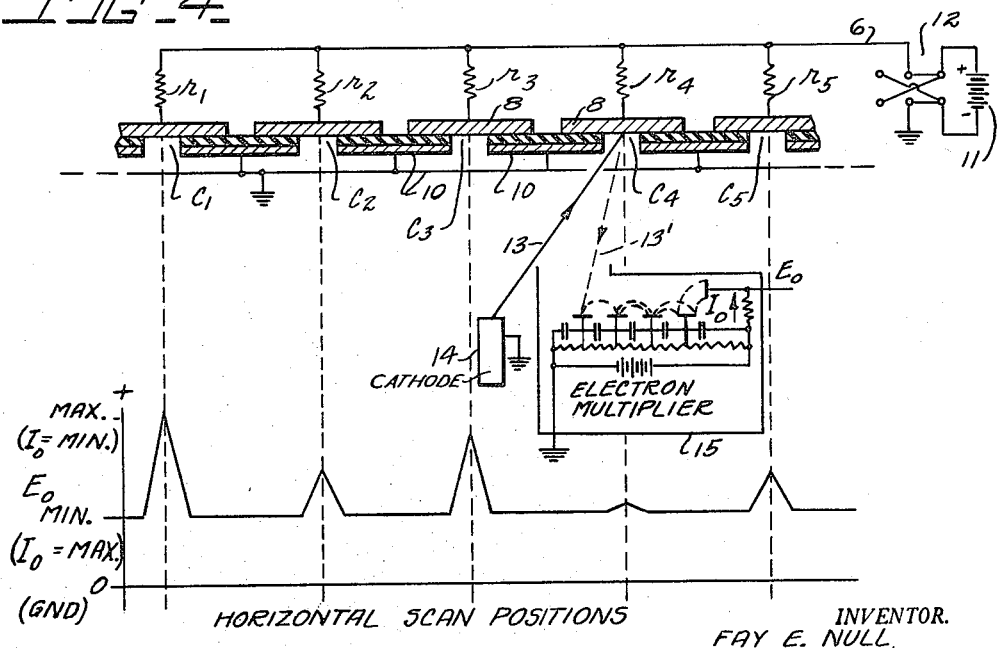
INVENTOR.
FAY E. NULL

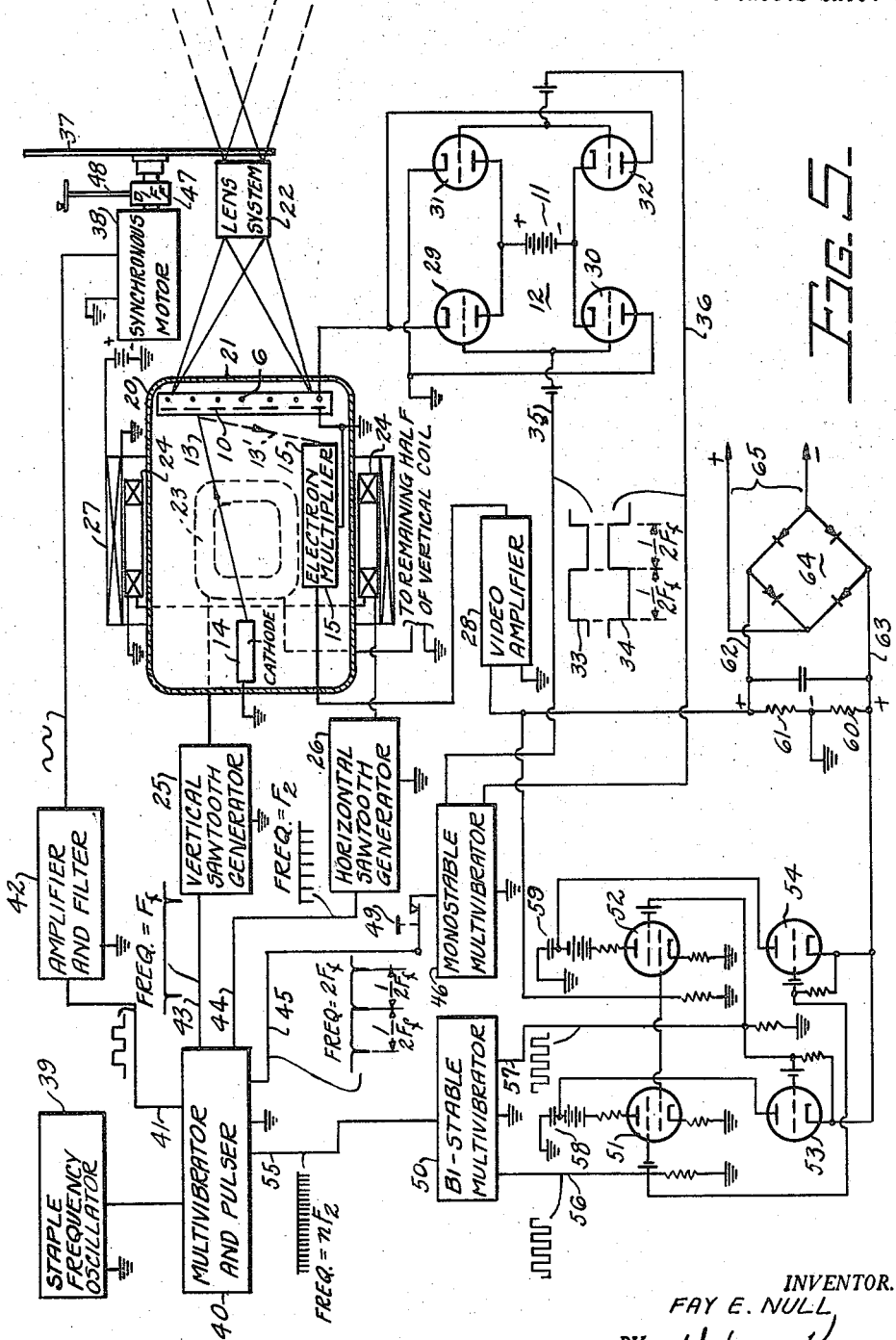

2,951,175

DETECTOR SYSTEM

Fay E. Null, Shalimar, Fla., assignor to the United States of America as represented by the Secretary of the Air Force Filed Oct. 23, 1956, Ser. No. 617,891

7 Claims. (Cl. 315—10)

(Granted under Title 35, U.S. Code (1952), sec. 266)

The invention described herein may be manufactured and used by or for the United States Government for governmental purposes without payment to me of any royalty thereon.

This invention relates to infrared detector systems of the type that scan a field of view and produce an electrical signal whenever a source of infrared radiation is encountered in the scanned field. Such systems are of two general types: In one type an optical image of the field is formed on a mosaic made up of a very large number of minute photoconductive cells which are scanned by an electron beam to produce the desired electrical signal. In the other type a single photoconductive cell is utilized with an optical scanning system which forms images of successive elemental areas of the scanned field on the signal producing cell. Of the two, the mosaic type is preferable since the number of information signals received per second from the field of view is much greater than in the single cell type. For example, an infrared mosaic of 400 line definition has 160,000 mosaic elements each equivalent in function to a single photoconductive cell. Such a mosaic can readily be scanned by an electron beam at a rate of one hundred frames per second producing signals at the rate of 100 × 160,000 or 16,000,000 per second as compared with a rate of 3000 or so signals per second for a scanning system using a single cell. The mosaic, therefore, has the ability to cover a large field of view very rapidly with high definition. This allows detection of the radiation from small angular portions of a field of view in very short consecutive periods of time.

Although infrared mosaics are more desirable from the resolution standpoint, they have in the past been inferior to single cell systems in sensitivity. In those mosaics where an increase in sensitivity has been sought by the use of the storage principle, the signal-to-noise ratio has been seriously limited by the spurious signal produced by nonuniformity of the dark currents over the surface of the mosaic. On the other hand, in mosaics where the effect of the dark currents has been successfully eliminated the technique employed has not permitted the use of the storage principle with its inherent gain in sensitivity. In order to utilize the signal storage principle and still eliminate the effect of dark current nonuniformities, it has previously been considered necessary to employ a memory device, such as a magnetic recorder, for playback of successive frames in opposite phase to the preceding frame, so that signal from corresponding points on the mosaic will cancel unless the illumination at that point has changed. However, the weight and bulk of such a magnetic device are disadvantages in applications where lightness and small size are desirable, as in a small missile.

The primary object of the invention, therefore, is to provide an infrared mosaic of high sensitivity and a signal-to-noise ratio approaching that of a single cell.

A further object of the invention is to provide an infrared mosaic employing the storage principle in which the effects of dark current nonuniformities are eliminated by a technique not having the disadvantages of the magnetic technique mentioned above.

An additional object of the invention is to provide an infrared detector of the scanned mosaic type in which the signal-to-noise ratio is improved by producing an output signal proportional to the difference in signal voltage between successive mosaic elements. This greatly reduces the spurious signals caused by nonuniformity of mosaic sensitivity, gradients in aerodynamically heated infrared windows, gradients in target backgrounds, and possible residual rectifier effects at the photoconductor contacts.

Briefly, in accordance with the invention, the mosaic of the infrared detector is of the double sided type having a radiation side on which an infrared image of the field of view is formed and a scan side which is scanned by an electron beam to produce the output signal. The mosaic is constructed on a glass plate as a substrate. One side of the plate, the radiation side, is coated with a photoconductive substance sensitive to infrared radiation, such as lead sulphide, with the coating divided into elemental square areas by a conductive grid. Located opposite these elemental areas on the other or scan side of the plate are a corresponding number of square elemental conductive plates. Conductors passing through the glass plate connect the center of each elemental area of photoconductor to the center of the corresponding elemental conductive plate. A layer of insulating material and a layer of conductive material are placed over the scan side of the mosaic, each layer having openings that register with the centers of the elemental conductive plates. It is evident that the elemental conductive plates form, with the layer of conductive material from which they are separated by the insulating material, a plurality of elemental condensers each connected to one of the elemental areas of photoconductive material. If a potential is established between the conductive grid and the layer of conductive material on the scan side these condensers will charge, in a given length of time, to a potential determined by the resistance of the photoconductive material in the corresponding elemental area which, in turn, is determined by the infrared radiation incident thereon. The distribution of charge on the condensers therefore corresponds to the infrared image.

In order to convert the image into a video signal the mosaic is scanned by a beam of low velocity electrons derived from a cathode which is at the same potential as the layer of conductive material on the mosaic. When the scanning beam impinges on the conductive layer all of the electrons are reflected from the mosaic. However, when the beam passes through the openings in the conductive and insulating layers and strikes an elemental conductive plate the number of electrons reflected is reduced by the number of electrons required to neutralize the positive charge on the particular elemental plate. The electrons reflected from the mosaic during the scanning process enter an electron multiplier to produce an amplified video signal. Spurious components in the output video signal due to nonuniformities in the mosaic dark currents are prevented by means of a synchronized shutter which admits infrared illumination to the mosaic during one-half only of each scanning frame and by a synchronized switching means which reverses the polarity between the conductive grid and the layer of conductive material of the mosaic at each transition between the illuminated and darkened states. This causes the charge on each elemental condenser in the mosaic due to dark current to be zero at the time that condenser is scanned by the electron beam. To obtain the final output signal of the detector the video output signal for each element of the mosaic is stored and subtracted from the output of the next succeeding element, A more detailed description of the invention will be given in connection with the specific embodiment thereof shown in the accompanying drawings, in which Fig. 1 is a cross section of the mosaic in a simplified circuit;

Fig. 3 is a view of the scan side of the mosaic;

Fig. 4 is a schematic diagram illustrating the operation of the mosaic; and

Fig. 5 is a schematic diagram of a practical embodiment of the infrared detector system.

Figure 1:
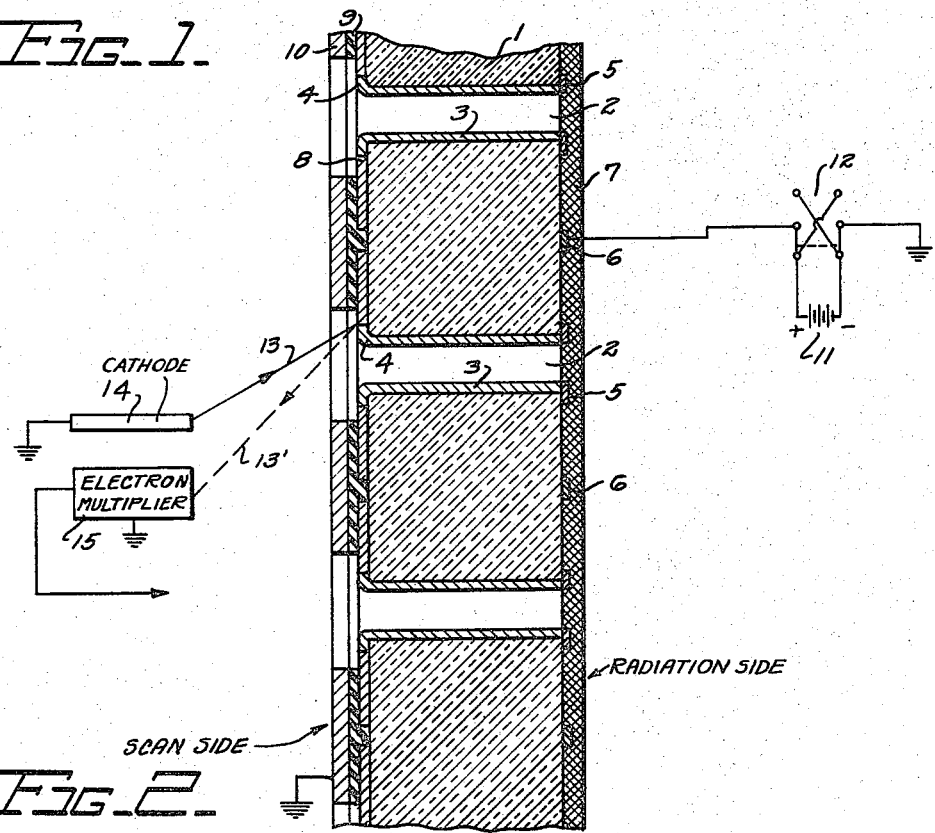
Figure 2:
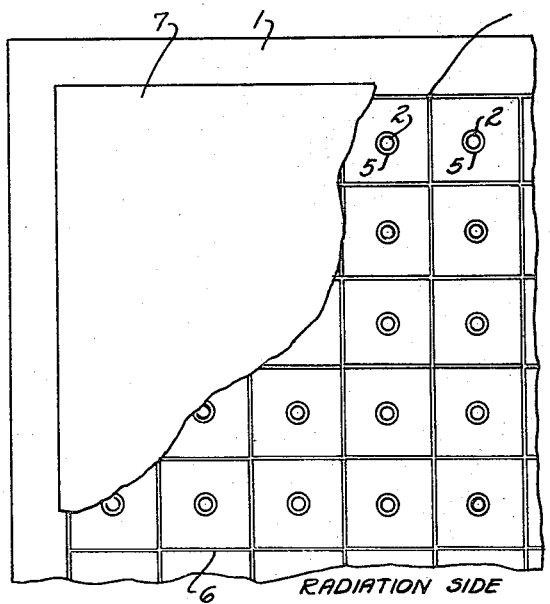
Fig. 2 is a view of the radiation side of the mosaic.

Referring to Figs. 1, 2 and 3, the infrared mosaic is constructed on a glass plate 1 having an array of holes 2 photo-etched through the glass and located at the intersections of two mutually rectangular sets of equally spaced parallel lines lying on the surface of the plate. The holes have a gold coating 3 which may be applied by evaporation or deposition from gold solution. The resulting conductive tubes extending through the glass terminate in gold rims 4 on the scan side and in stenciled aquadag rims 5 on the radiation side. An aquadag grid 6 is also formed on the radiation side and over this is deposited a layer of lead sulphide 7 which makes nonrectifying contacts with the grid 6 and aquadag rims 5. On the scan side each hole 2 is situated in the center of a conductive plate 8 which makes contact with rim 4 and is of the same size as the elemental rectangular area of lead sulphide, defined by the grid mesh, that is centered relative to the other end of the hole and which makes electrical contact with the conductive lining 3 of the hole through the aquadag rim 5. The conductive tubes 3 therefore serve to connect the elemental areas of lead sulphide on the radiation side to the elemental conductive plates 8 on the scan side. The scan side of the mosaic is completed by the deposit of a layer of insulating material 9, such as evaporated quartz, over the elemental plates 8 and a layer of metal 10 over the insulating material. Both the insulating layer 9 and the conductive layer 10 have registering square openings, best seen in Fig. 3, for exposing a small area of each plate 8 in the vicinity of rim 4.

It is evident from Fig. 1 that grid 6 divides the photoconductive layer 7 into a number of photoconductive elements each being defined by the boundaries of an opening or mesh of the grid and each having a conductive tube 3 at its center. As seen later in Fig. 4, each of the photoconductive elements is in effect a resistor, constituted by the photoconductive material lying between the boundary of the grid opening and the conductive tube, the resistance of which depends upon the amount of infrared radiation falling upon the element. Each of these photoconductive elements is operationally independent of the other elements, i.e. its resistance can vary in response to changes in incident infrared radiation independently of the resistance variation of the other elements. It is also evident from Fig. 1 that a plurality of elemental condensers are formed by plates 8 and conductive layer 10, each condenser being connected to an elemental area of lead sulphide on the radiation side by conductive tubes 3. In operation, charging and discharge circuits are provided for these condensers as shown in simplified schematic form in Fig. 1. The charging circuit may be traced from ground through battery 11, polarity reversing switch 12, grid 6, the elemental areas of lead sulphide in parallel, conductive tubes 3, and conductive layer 10 to ground. The discharge circuit employs a low velocity electron beam 13 derived from cathode 14 which is at the same potential as conductive layer 10. Means, not shown, cause the beam to scan the scan side of the mosaic along horizontal lines passing through the centers of the square openings in layer 10. When the beam impinges on conductive layer 10 all of the electrons are reflected since this layer is at the same potential as the cathode. The reflected electrons 13' enter electron multiplier 15 which, therefore, has its maximum current output ($I_0$ in Fig. 4) when the beam falls wholly on layer 10. When the beam passes through an opening in conductive layer 10 (and insulating layer 9) and strikes the associated elemental plate 8 the number of electrons reflected will depend upon the positive charge on the elemental plate. If there is no charge on the elemental condenser so that the plate 8 is at the same potential as layer 10 all of the electrons are reflected as when the beam impinges on layer 10. However, if an elemental condenser is charged such that plate 8 is positive relative to layer 10, the number of electrons reflected equals the total number of electrons less the number of electrons required to neutralize the positive charge on plate 8. Consequently, the output current of the electron multiplier is inversely related to the charge on the elemental condenser and as the mosaic is scanned this current represents, inversely, the distribution of charge in the elemental condensers of the mosaic.

The foregoing is illustrated in more detail in the equivalent circuit of Fig. 4. In this figure the equivalent mosaic and circuit elements bear the same reference numerals as in Fig. 1. The reference characters $c_1$—$c_5$ represent elemental mosaic condensers each formed by one of the elemental plates 8 and conductive layer 10. The resistors $r_1$—$r_5$ are all nominally equal and represent in each case the resistance of the elemental area of lead sulphide located in circuit between grid 6 and one of the plates 8. When an infrared image is formed on the radiation side of the mosaic the values of these resistors are decreased from their dark values in direct relation to the amount of infrared radiation falling upon the corresponding elemental areas of lead sulphide. Assume the mosaic section of Fig. 4 to be taken along a horizontal scan line and that the beam 13 scans from left to right. The beam starts at the top of the mosaic and scans line by line until the bottom is reached completing one scanning frame. The beam then returns rapidly to the top of the mosaic and begins the next frame. Therefore the interval of time between successive scans of any one elemental condenser is one frame period. With switch 12 in the position shown elemental condenser $c_2$, for example, charges during the period between scans to a potential determined by the value of $r_2$ which in turn is determined by the infrared radiation falling upon the corresponding elemental area of lead sulphide. At the next scan the positive charge on plate 8 of $c_2$ is neutralized by the electron beam, returning this condenser to a discharged state. As soon as the beam has passed beyond the opening in layer 10 at $c_2$, the elemental condenser begins to recharge to its previous value or to a new value depending upon whether the incident radiation has changed. During discharge of the elemental condenser the difference between the beam electron current and the electron current flowing into the condenser enters the electron multiplier. Representative output signals for the five elemental condensers are shown. Condenser $c_1$ is represented as having its maximum charge when scanned. Under this condition the electron current entering the multiplier has its minimum value and $I_0$ therefore is at a minimum resulting in a maximum value for $E_0$. Condenser $c_4$ is represented as having a very small charge indicating a low level of infrared radiation of the associated lead sulphide elemental area. For this condition substantially all of the electron beam current enters the multiplier producing a high value of $I_0$ and a low value of $E_0$. The remaining condensers are represented as having intermediate charges. When the scanning beam impinges wholly on conductive layer 10 the entire scanning beam current enters the multiplier producing the maximum value of $I_0$ and the minimum value of $E_0$. This minimum value of $E_0$ constitutes a constant component in the video signal and may be eliminated if desired in any suitable manner. For example, an equal voltage of opposite polarity may be inserted in series with $E_0$ or the first stage of the video amplifier to which $E_0$ is applied may be biased beyond cut-off by the proper amount to eliminate this component.

The above illustrates the utilization of the storage principle in an infrared sensitive mosaic, but such a system alone would be unsatisfactory because of the low signal-to-noise ratio resulting from unavoidable nonuniformities in the lead sulphide. During the interval between scans each elemental condenser accumulates a charge which may be considered as the sum of a fixed charge corresponding to the dark value of lead sulphide resistance and a variable charge corresponding to the decrease in lead sulphide resistance from its dark value due to incident infrared radiation. The value of the fixed charge is the same in each scanning interval and is independent of incident radiation, whereas the variable charge changes as the strength of the infrared radiation striking the elemental area changes. Although the fixed charge does not change for an individual elemental condenser it is not the same for all elemental condensers because of nonuniformities in the lead sulphide. Therefore two factors influence the charge distribution over the mosaic: (1) the distribution of incident infrared radiation and (2) nonuniformities in the lead sulphide layer. Since the effect of the second factor may equal or exceed that of the first the resulting spurious video signal may mask the true signal representing infrared distribution.

In accordance with the invention the effect of nonuniformities in the lead sulphide layer is eliminated by reducing the component of charge in each elemental condenser due to dark currents to zero at the time the condenser is scanned. This is accomplished by reversing the polarity of the charging voltage twice during each frame period or interval between successive scans. Therefore, before being scanned, each elemental condenser is subjected to a one-half frame period interval of dark current charge with the current flowing in one direction and an equal one-half frame period interval of dark current charge with the dark current flowing in the opposite direction so that the net dark current charge between scans is zero. In the schematic showing of Fig. 4 the above may be accomplished by operating polarity reversing switch 12 twice during each frame period, the switch remaining in each position for one-half frame period. Although this arrangement insures that the net change in dark current charge on an elemental condenser between scans is zero, it does not insure the required zero dark current charge on the condenser at the time of scan unless the charge on the condenser was reduced to zero by the preceding scan. Since only positive charges (plate 8 positive) can be neutralized by beam 13 it is therefore essential to insure that the charges on all condensers are positive at the time the switching operation begins so that the first scan of each condenser after the switching operation begins is able to reduce its charge to zero. When this initial condition is met subsequent scans of the elemental condensers will be at conditions of zero dark current charge since the action of switch 12 prevents any net change in dark current charge between scans. The initial positive charge may be brought about by having switch 12 in its positive charge position, as shown in Fig. 4, for a sufficient period preceding initiation of the switching cycle to insure a positive charge on all of the elemental condensers except, of course, the one on which the beam is impinging at the instant which as a result has zero charge.

In order to prevent the above process from also cancelling the charge on the elemental condensers due to infrared radiation a shutter means, synchronized with switch 12, is used to admit radiation to the mosaic only when switch 12 is in the positive charge position as will be shown in Fig. 5.

A practical embodiment of an infrared detector circuit in accordance with the invention is shown in Fig. 5. In this figure, a mosaic of the type shown in Fig. 1 is enclosed in an evacuated envelope 20 having an infrared window 21. An infrared image of the field of view is focussed on the radiation side of the mosaic by lens system 22. Electron beam 13, derived from cathode 14, is caused to line scan the scan side of the mosaic by vertical and horizontal deflection currents supplied to vertical and horizontal deflection coils 23 and 24 by vertical and horizontal sawtooth generators 25 and 26. Coil 27 is for focussing the electron beam. A scanning beam of low velocity electrons, such as employed in the image orthicon type of tube, is used. The electrons 13' reflected from the mosaic, and representative of the distribution of charge in the elemental condensers as already explained, enter electron multiplier 15. The video output of this multiplier is applied to the input of video amplifier 28.

Tubes 29, 30, 31 and 32 perform the function of switch 12 in Figs. 1 and 4. When tubes 29 and 30 are conductive and tubes 31 and 32 are nonconductive, battery 11 is so connected that grid 6 is positive relative to conductive layer 10 or ground. When tubes 31 and 32 are conductive and tubes 29 and 30 are nonconductive, the polarity of battery 11 is in effect reversed and grid 6 is negative relative to ground and conductive layer 10. The conductivities of these tubes are controlled by rectangular voltage waves 33 and 34 on conductors 35 and 36.

As already pointed out, it is necessary to have means synchronized with switch 12 for admitting infrared radiation to the mosaic only during the times that grid 6 is positive. This function is performed by disc shutter 37 driven at constant speed by synchronous motor 38. The angular extents of the opaque and transparent portions of disc 37 are equal and should be great compared with the angle subtended by the aperture of the lens system 22 in order that the transition time between light and dark periods may be short compared to the periods.

Stable frequency oscillator 39 provides a time reference for synchronizing the various operations taking place in the detector system. The output of this oscillator governs the operation of multivibrator and pulser circuit 40 which generates a number of synchronized waveforms on several output circuits. Output circuit 41 supplies a square wave to amplifier and filter 42 which in turn supplies an amplified sine wave of the same frequency to synchronous motor 38. Output circuits 43 and 44 supply vertical and horizontal synchronizing pulses to vertical and horizontal saw-tooth generators 25 and 26, respectively. Output circuit 45 supplies synchronizing pulses at twice the frame frequency $F_f$ to monostable multivibrator 46 triggering both the stable and quasistable states. This multivibrator generates the square waves of voltage 33 and 34 for controlling switch 12. Tubes 29—32 of this switch are so biased as to conduct during the more positive half-cycle of the square wave and to be nonconductive during the less positive half-cycle.

With the above described arrangement switch 12 reverses the polarity of grid 6 at twice the frame frequency $F_f$, as required. By proper correlation of the frequency of the square wave input to amplifier 42, the number of poles of synchronous motor 38 and the angular extent of the opaque and transparent portions of shutter 37, there may be obtained transitions between light and dark conditions of the mosaic at twice frame frequency, as required. The final requirement that infrared radiation be admitted to the mosaic only when grid 6 is positive may be met by proper phasing of the shutter relative to switch 12. Adjustments of this phase relation may be made in any suitable manner, as by use of a differential gear 47 with phase adjusting shaft 48 between motor 38 and the shutter disc 37.

Multivibrator 46 is of the monostable type in order to provide for the initial conditioning of the mosaic as discussed in connection with Fig. 4. Here it was pointed out that all elemental condensers of the mosaic (except the one being scanned at the instant) should have a positive charge at the time operation of switch 12 is initiated. To accomplish this, monostable mutivibrator 46 is designed so that in its stable state voltages 33 and 34 are such that tubes 29 and 30 are conductive and tubes 31 and 32 nonconductive, placing a positive potential on grid 6. Therefore if, at any time during operation of the detector circuit, trigger pulses are removed from multivibrator 46, as by opening switch 49, the multivibrator reverts to its stable state and a constant positive voltage is applied to grid 6 for as long as the switch is open, allowing the mosaic to attain the desired initial condition of positive charge. Closure of switch 49 causes cyclic operation of switch 12 to resume with the next trigger pulse. Obviously, there may be employed in place of switch 49, or in addition thereto, a delay means in circuit 40 operative upon energization of the detector circuit to prevent the application of trigger pulses to multivibrator 46 until the remainder of the detector circuit has been energized for an interval of sufficient duration to insure the required initial state of charge on the mosaic.

As has been stated already, the signal-to-noise ratio of the output signal can be further improved by making the output signal proportional to the difference in the signals from adjacent mosaic elements. This result is accomplished by that part of the circuit of Fig. 5 incorporating bistable multivibrator 50 and tubes 51—54. Circuit 40 supplies on output line 55 a series of trigger pulses occurring at a frequency of $nF_1$, where $n$ is the number of elements, or elemental condensers, in a horizontal line of the mosaic. These pulses are applied to multivibrator 50 causing that circuit to generate oppositely phased rectangular waves of frequency $\frac{1}{2}nF_1$ on output lines 56 and 57. The rectangular waves on these lines act as gating pulses on the screen grids of tubes 51 and 52, respectively. The screen grids of these tubes are so biased that the tubes are inoperative in the presence of the lesser voltage of the rectangular waves but are operative to pass any signal on the control grids in the presence of the greater voltage of the rectangular waves. The video signal output of amplifier 28 is applied in parallel to the control grids of tubes 51 and 52. Further, the rectangular wave applied to the screen grid of tube 51 is also applied to the control grid of tube 54 and that applied to the screen grid of tube 52 is also applied to the control grid of tube 53. Tube 54 is therefore conductive whenever tube 51 is operative and nonconductive whenever tube 51 is inoperative. Similarly, tube 53 is conductive whenever tube 52 is operative and nonconductive whenever tube 52 is inoperative. Tubes 53 and 54, when conductive, allow condensers 58 and 59, respectively, to discharge through resistor 60. The video output of amplifier 28 is also applied across resistor 61, so that the output signal appearing across lines 62 and 63 is the difference in the signals across resistors 60 and 61.

The operation of the above circuit is as follows: Consider three adjacent elemental condensers $c_1$, $c_2$ and $c_3$ arranged in one of the horizontal lines of the mosaic and assume that the beam is impinging on $c_2$. Further, assume that tubes 51 and 54 are conductive and tubes 52 and 53 are nonconductive. Under these conditions the output signal from $c_2$ charges condenser 58 through tube 51, and condenser 59, which was just previously charged in a similar manner by the output signal of $c_1$ acting through tube 52, discharges through tube 54 and resistor 60. Therefore, at this instant the output signal from $c_2$ exists across resistor 61 and the output signal from $c_1$ exists across resistor 60. The difference between these two signals appears between conductors 62 and 63. When the scanning beam has progressed to the next elemental condenser $c_3$ tubes 52 and 53 are conductive and tubes 51 and 54 nonconductive, so that condenser 59 assumes a charge proportional to the output of elemental condenser $c_3$ and condenser 58, which has a charge proportional to the output of condenser $c_2$, discharges through tube 53 and resistor 60. Voltages proportional to the signal outputs of condensers $c_3$ and $c_2$ now appear across resistors 61 and 60, and the difference in these two voltages appears between conductors 62 and 63. The voltage between these conductors at any instant therefore is a contrast signal representing the difference between the signal output of the elemental condenser being scanned at the instant and the signal output of the next preceding elemental condenser in the scanning cycle.

Since the signal on conductors 62—63 may be of either polarity and since only the magnitude of the signal is of interest it is preferable to convert to a unipolar signal by means of bridge type rectifier 64. Various uses of the unipolar signal on conductors 65 may be made in guidance systems. The magnitude of the contrast signal may be used to furnish guidance signals to a conventional missile course computer, and/or to a cathode-ray screen to indicate the position of the target in the field of view. For example, contrast signals from leads 65 can trigger gates to sample the scen beam deflection currents at the instant the signal occurs, and thus obtain guidance voltages proportional to the deflection of the scan beam from the center of the field of view. To indicate the position of the target on a cathode-ray tube screen, the beam of the indicator tube may be deflected in synchronism with the beam of the infrared detector tube and the spot intensified at the instant the signal is obtained.

I claim:

1. A radiation sensitive mosaic comprising a substrate of insulating material, a layer of photoconductive material on one side of said substrate, conductive grid means having identical openings, said grid means being embedded in said photoconductive material and defining identical elemental areas therein, a corresponding number of discrete elemental conductive plates attached to the other side of said substrate, each plate being positioned opposite its corresponding elemental area of photoconductive material, a conductor extending from the center of each elemental area of photoconductive material through said substrate to the corresponding conductive plate, a layer of insulating material over said plates, a layer of conductive material over said insulating material, said last named layers having registering openings above each conductive plate exposing a portion of each plate.

2. An infrared sensitive mosaic comprising a substrate of insulating material, a layer of infrared sensitive photoconductive material, on one side of said substrate, conductive grid means having identical openings, said grid means being embedded in said photoconductive material and defining identical elemental areas, said grid means being made of a conductive material forming a nonrectifying electrical contact with the photoconductive material, a corresponding number of discrete elemental conductive plates attached to the other side of said substrate, each plate being positioned opposite the corresponding elemental area of photoconductive material, a conductor making a nonrectifying electrical contact with the center of each elemental area of photoconductive material and extending through said substrate to the corresponding conductive plate, a layer of insulating material over said plates, a layer of conductive material over said insulating material, said last named layers having registering openings above each conductive plate exposing a portion of each plate.

3. An infrared sensitive mosiac comprising a substrate in the form of a plate of insulating material having a plurality of holes extending therethrough, said holes being located at the intersections of two mutually rectangular sets of equally spaced parallel lines, lying on the surface of said plate, said holes having their surfaces covered with a conductive material and having conductive rims at their ends connected to their conductive surfaces and extending above the surface of said substrate; a rectangular conductive grid attached to one surface of said substrate such that the holes in the substrate are in the centers of the grid meshes; a layer of infrared sensitive photoconductive material deposited over the grid side of said substrate and making electrical contact with said grid and the rims of said holes, the conductive material of said grid and said rims being such as to make a nonrectifying contact with said photoconductive material; a plurality of discrete conductive plates attached to the other side of said substrate, centered relative to said holes and making electrical contact with the rims of said holes; a layer of insulating material deposited over said conductive plates; a layer of conductive material deposited over said insulating material; said last named layers having registering openings above the center of each conductive plate exposing a portion of each plate.

4. In an infrared detector system, a mosaic comprising a member of operationally independent photoconductive elements, an equal member of condenser elements each in series with one of said photoconductive elements, means for alternately charging said condensers through said photoconductive elements by voltage sources of opposite polarity for successive equal intervals of time for cancellation of dark current charges, means for obtaining a signal by the discharge of said condensers by an electron beam, and means for admitting infrared radiation to said photoconductive elements during condenser charge intervals for a voltage source of one polarity only whereby cancellation of true signal charges is prevented.

5. An infrared detection system comprising a mosaic in an evacuated envelope, said mosaic comprising a number of identical operationally independent photoconductive elements, an equal number of elemental condensers, means connecting each photoconductive element in series with one of said condensers to form a plurality of series circuits, a two-terminal source of voltage, means connecting said series circuits in parallel between the terminals of said voltage source, video signal generating means comprising electron beam generating means in said envelope and scanning means causing said beam to periodically discharge said elemental condensers in a predetermined sequence, means synchronized with said scanning means for reversing the polarity at the terminals of said voltage source periodically at twice the scanning frequency, and means synchronized with said polarity reversing means for admitting infrared radiation to said photoconductive elements only during one of the two possible polarities at said terminals.

6. An infrared detection system comprising a mosaic in an evacuated envelope, said mosaic comprising a number of identical operationally independent photoconductive elements and an equal number of identical elemental condensers, means connecting each photoconductive element in series with an elemental condenser to form a plurality of series circuits, a source of direct voltage, means including a polarity reversing means for connecting said series circuits in parallel across said source of direct voltage with all condensers connected to the same side of said source, a charge neutralizing circuit for said elemental condensers comprising electron beam generating means connected to the common side of said condensers and scanning means for bringing said beam into contact with the other side of each of said condensers in succession in a predetermined periodically repeating sequence, means synchronized with said scanning means for operating said polarity reversing means at twice the frequency of said repeating sequence, means synchronized with said polarity reversing means for admitting infrared radiation to said photoconductive surfaces during only one of the two possible conditions of said polarity reversing means, and a video output circuit comprising means for collecting the beam electrons in excess of those required to neutralize the charges on said condensers.

7. An infrared detection system comprising an infrared sensitive mosaic of the type having a plurality of elemental condensers which receive charges in conformity with the intensity distribution of incident infrared radiation, means comprising a scanning electron beam for producing a signal representative of the charges on said condensers as they are scanned in succession, and means for producing an output signal comprising means for storing the signal produced by each condenser and subtracting it from the signal produced by the next succeeding condenser in the scanning cycle.

References Cited in the file of this patent

UNITED STATES PATENTS

| | | |
|---|---|---|
| 2,204,250 | Hickok | June 11, 1940 |
| 2,238,381 | Batchelor | Apr. 15, 1941 |
| 2,747,131 | Sheldon | May 22, 1956 |
| 2,786,157 | Theile | Mar. 19, 1957 |